United States Patent [19]
Eckstein

[11] Patent Number: 5,990,861
[45] Date of Patent: Nov. 23, 1999

[54] METHOD OF AND APPARATUS FOR REPROGRAMMING A VIDEO CONTROLLER

[75] Inventor: Bruce Eckstein, Cupertino, Calif.

[73] Assignee: Apple Computer, Inc., Cupertino, Calif.

[21] Appl. No.: 08/911,504

[22] Filed: Aug. 14, 1997

Related U.S. Application Data

[63] Continuation of application No. 08/436,967, May 8, 1995, abandoned.

[51] Int. Cl.⁶ .................................................... G09G 5/00
[52] U.S. Cl. ........................... 345/115; 345/213; 348/565
[58] Field of Search .................................... 348/579, 565, 348/560, 567, 568, 588, 459, 552, 510; 345/113, 114, 115, 116, 118, 119, 120, 213, 302, 127, 339, 340, 343

[56] References Cited

U.S. PATENT DOCUMENTS

| | | | |
|---|---|---|---|
| 5,185,603 | 2/1993 | Medin | 348/510 |
| 5,250,933 | 10/1993 | Reaudin et al. | 345/115 |
| 5,327,156 | 7/1994 | Masukane et al. | 345/113 |
| 5,382,972 | 1/1995 | Kannes | 348/15 |
| 5,406,306 | 4/1995 | Siann et al. | 345/115 |
| 5,412,400 | 5/1995 | Takahara et al. | 345/119 |

*Primary Examiner*—Dennis-Doon Chow
*Attorney, Agent, or Firm*—Burns, Doane, Swecker & Mathis, L.L.P.

[57] ABSTRACT

A method for reprogramming a video input device to multiplex video data from at least two different video sources is disclosed. A video input device contains control registers for controlling the behavior of the video input device. At least first video data from a first source and a second video data from a second source are received at the video input device. Information about the video data is sent to a controller which generates reprogramming data based on the information. The reprogramming data is transmitted to the video input device, wherein the reprogramming data reprograms the operation of the control registers. Portions of the first and second video data are outputted based upon how the control registers are reprogrammed.

18 Claims, 3 Drawing Sheets

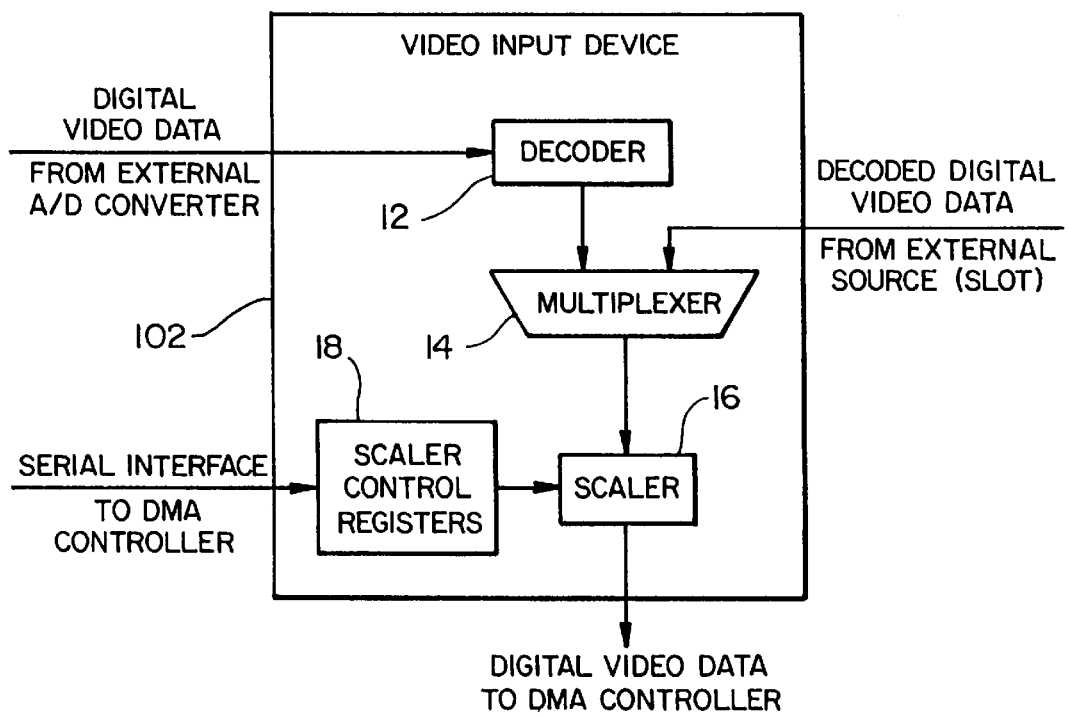
FIG_1
(PRIOR ART)

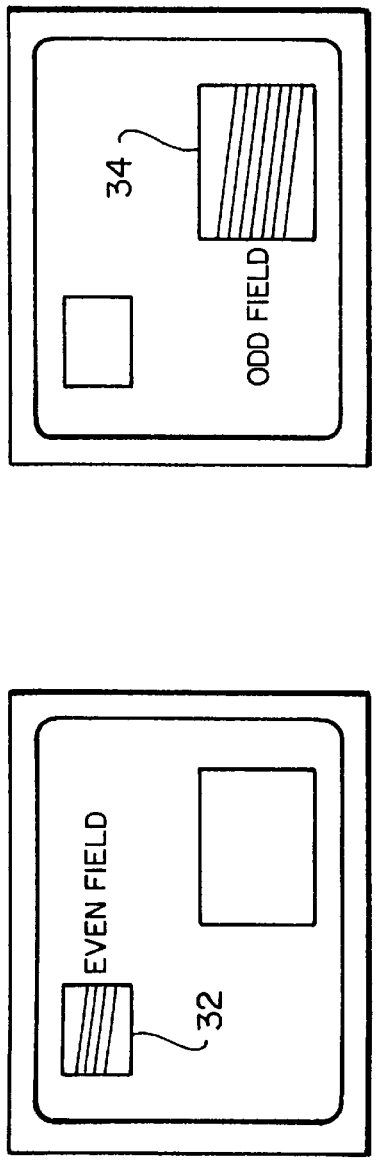
FIG_2
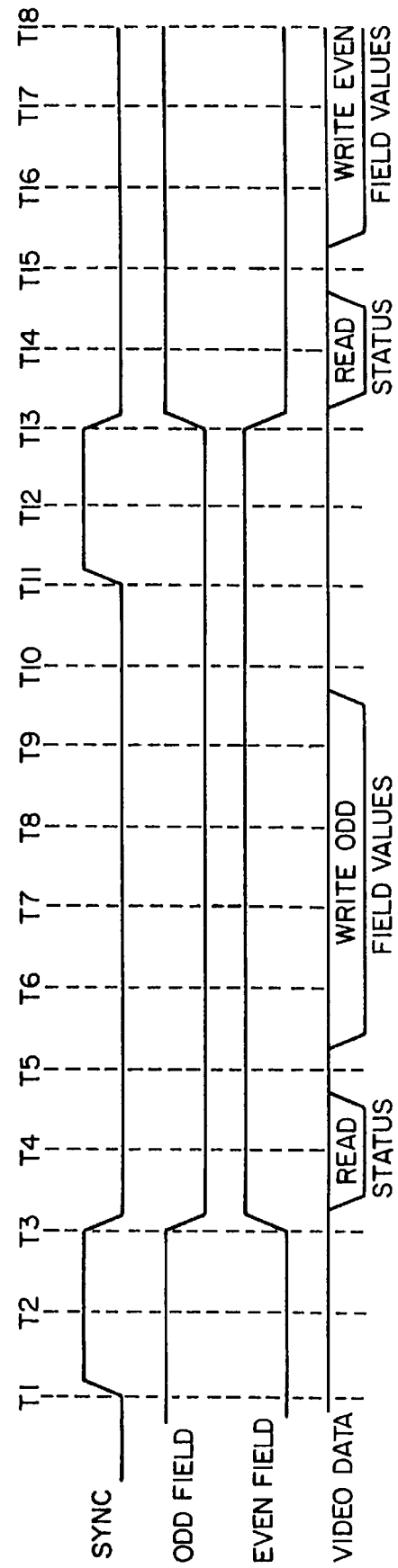
FIG_4

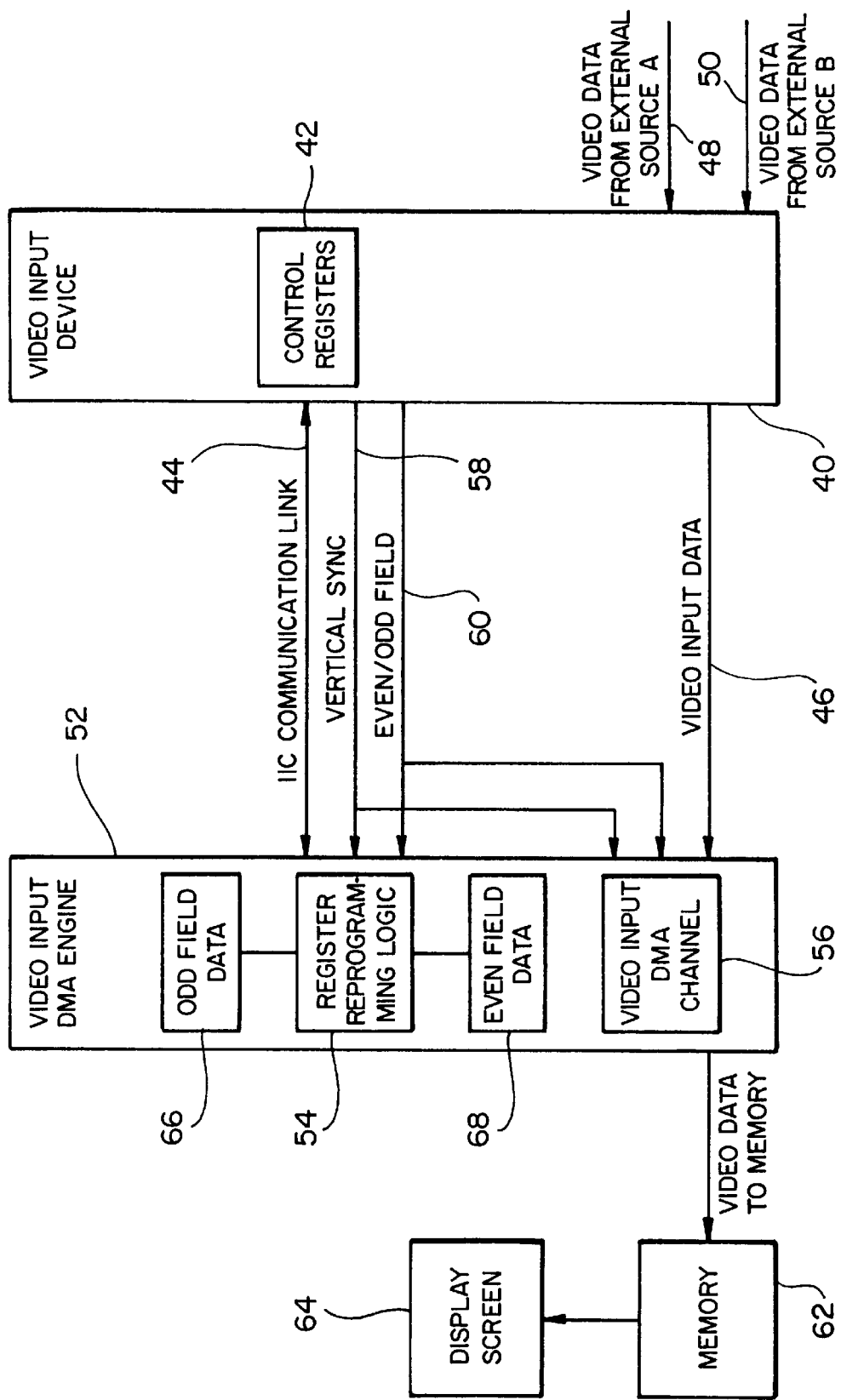
FIG_3

METHOD OF AND APPARATUS FOR REPROGRAMMING A VIDEO CONTROLLER

This application is a continuation, of application Ser. No. 08/436,967, filed May 8, 1995, abandoned.

FIELD OF THE INVENTION

The present invention relates to a method and apparatus for processing video data streams in a personal computer, and more particularly to a method and apparatus for reprogramming a video controller to allow the video controller to multiplex a plurality of video data streams received from different video sources.

BACKGROUND OF THE DISCLOSURE

Demands are increasingly being placed on computers to be able to run applications using video data. As a result, computer systems need to have video interfaces to provide an input/output interface. Once such interface is illustrated in FIG. 1. The video chip 10 illustrated in FIG. 1 is made up of several sections: a decoder section 12; a multiplexer section 14; and a scalar section 16. The decoder section 12 receives digital video data from an external A/D converter. The decoder 12 extracts and formats video related information from the input video stream. The multiplexer section 14 selects between the data from the decoder 12 and decoded data being directly supplied by another external source. The scaler section 16 receives the video data stream from the output of the multiplexer 14 and scales the image based on the contents of the scalar control registers 18.

The scalar control registers 18 control the behavior of a video chip. By programming the control registers in various ways, the video chip will perform different operations on the received video data before outputting the video data to an I/O controller, such as a direct memory access (DMA) controller which takes the digitized video stream and writes it into memory.

DMA is a common method for performing input/output on personal computers, mini computers, and mainframe computers. DMA permits the transfer of blocks of data without processor intervention, using a separate DMA controller that can gain access to the memory in which the host processor has set the buffers. In some implementations, the DMA controller may be controlled by one or more programs that are also set up in the memory by the host processor. As illustrated in FIG. 1, the scaler control registers are accessed by the DMA controller via a serial interface 20. The two-wire serial interface allows communication between the video chip and the DMA controller.

While this prior art method for providing video data is adequate for providing a single image on the display screen, it may be advantageous in some situations to be able to provide multiple images from different video streams on the same display screen at the same time. One such situation arises in teleconferencing. In teleconferencing, a user may wish to divide the screen into several regions to simultaneously display several images on the same screen. For example, the teleconferencing users may wish to display a video image of a meeting room in Washington, and a video image from a meeting room in San Francisco on each of the display screens in each of the meeting rooms in San Francisco and Washington. However, the prior art system described in FIG. 1 is not capable of displaying two separate video images as required in teleconferencing.

One method for providing dual images on a screen would be to provide two video chips wherein one video chip supplies one image and the other video chip supplies the other image. However, the addition of an extra video chip can be costly, both in terms of space as well as monetarily. As a result, there is a need for a method and apparatus for providing dual images on a display screen wherein the images displayed on the screen come from different video streams fed into a single video chip.

SUMMARY OF THE INVENTION

It is an object of the present invention to overcome the problems within prior art systems by providing a method for reprogramming the control registers in a video chip so as to multiplex a plurality of video signals from different video sources and be able to display a plurality of images on a display screen.

According to one embodiment of the present invention, a method for simultaneously displaying two different video images on a display screen is disclosed. A first video data stream from a first video source and a second video data stream from a second video source are received at a video input device wherein each video signal has an odd field and an even field. The video input device has a set of programmable control registers which control the operation of the video input device. For example, the control registers can be set so that the video input device only outputs only the first video data stream. When the video input device receives the video data streams, the video input device periodically extracts vertical sync and even/odd field information from the video data and transfers the information to an I/O controller. The I/O controller periodically generates reprogramming information for the control registers based on the vertical sync information and even/odd field information. The reprogramming information is then transferred back to said control registers. As a result, the control registers are periodically reprogrammed to pass certain portions of each of the data streams. For example, the even field video data of the first (or second) video data stream and odd field video data of the second (or first) video data stream can be transferred to the I/O controller based upon the reprogramming information. The transferred data streams are then assigned an address range in a memory based upon the vertical sync and even/odd field information so that all of the transferred portions of the first video data stream are stored together and all of the transferred portions of the second video data stream are stored together. Finally, the stored video data is displayed at two different locations on the display screen, wherein even field video data of the first (or second) video data stream is displayed at one location and the odd field video data of the second (or first) video data stream is displayed at another location on the display screen.

According to another embodiment of the present invention, a method and apparatus for multiplexing a plurality of video data streams from different sources in a video input device with one set of control registers which control the operation of the video input device is disclosed. At least a first video data stream from a first source and a second video data stream from a second source are received at the video input device. The video input device then determines certain video related characteristics such as vertical sync and even/odd field information from the video data streams. The control registers are reprogrammed based upon the vertical sync and even/odd field information. Finally, portions of the first and second data streams are outputted based upon how the control registers are programmed.

BRIEF DESCRIPTION OF THE DRAWINGS

The accompanying drawings, which are incorporated in and constitute a part of the specification, illustrate a preferred embodiment of the present invention and, together with the general description given above, and the detailed description given below, serve to explain the principles of the present invention, in which:

FIG. 1 illustrates a schematic block diagram of a prior art video chip;

FIG. 2 illustrates a display screen or monitor used for teleconferencing, or the like, according to one embodiment of the present invention;

FIG. 3 illustrates a schematic block diagram of a system according to one embodiment of the present invention; and FIG. 4 illustrates a timing sequence for reading and writing video fields according to one embodiment of the present invention.

DETAILED DESCRIPTION

While the present invention will be described in relation to teleconferencing, it will be appreciated by one skilled in the art that the present invention can be used in other video applications where multiple images need to be provided on a display screen.

According to one embodiment of the present invention, the video input device can accept video input data from two distinct input interfaces. Normally, only one of these two input interfaces is used so the contents of the control registers can be initialized and remain constant for the duration of the video input period.

One significant application, however, that requires alternating between two video input sources, and thus potentially requiring reprogramming of the control registers in the video input device, is teleconferencing. In teleconferencing, one party might be in California in front of a first video camera. The first video camera is connected to a first computer, which places the images into a window on the display screen of the first computer, and sends the same image over a network or phone line to another computer at another location. At the same time the first computer receives video data from a second camera located at the other location. A good human interface for this application would allow a person to simultaneously view both video images 32 and 34 on the display screen as illustrated in FIG. 2. In order to do this, the control registers in the video input device need to be periodically reprogrammed during the video input period so as to correctly process video data from two different input sources.

One characteristic of interlaced video data streams that can be exploited in this application is that each video frame is made up of two video fields. Each field contains half of the total video information necessary to display a single frame. One field contains the even-scan lines and the other field contains odd-scan lines. Normally, the data in each field is interlaced with the data from the other field to create a single video image. Interlacing of odd and even video fields is a common method for reducing the flicker that would otherwise occur.

Normally only one of the two video input sources is used at any given time and both of the video fields from this source are sent to the same location in memory to produce a single image. The present invention exploits frame division for interlacing by taking one field from each of the video data streams. For example, the even fields of video data from the first source can be selected and ultimately displayed at one location on a display screen, while the odd fields of video data from the second source can be selected and ultimately displayed at another location on the display screen. The multiplexing of this particular video input device is accomplished via the automatic reprogramming of the control registers contained in the video input device which results in the ability to simultaneously display two video images on the same display screen.

The multiplexing of the video input device according to one embodiment of the present invention will now be described with reference to FIG. 3. FIG. 3 illustrates a master/slave relationship between a video input device 40 and an I/O controller, such as a video input DMA engine 52. The video input device 40 receives video data 48 and 50 from at least two external sources A and B (not illustrated). The video input device 40 and the video input DMA engine 52 are connected together by a serial communications link 44 and a video input data link 46. The video input device 40 and the video input DMA engine 52 communicate with each other over the serial communication link 44 using a series communication protocol, such as an I$^2$C protocol. The video input device 40 also contains control registers 42 that are accessed by the communication link 44. The contents of the control registers 42 control the behavior of the video input device. In other words, the contents of the control registers determine how the video input device scales the received video data streams as well as which video data stream to output. The DMA engine contains a processor 54 that reprograms the control registers 42.

In order for the video input DMA engine to periodically reprogram the control registers in the video input device 40 at the appropriate time during the transfer of video data streams, the DMA engine 52 needs two additional pieces of information regarding the video data streams. The DMA engine needs vertical sync information 58 and even/odd field information 60. First the video input device 40 receives two video data streams 48 and 50 from two external sources A and B. The video input device 40 then extracts the vertical sync and even/odd field information from the input video data streams 48 and 50 in a known manner. The video input device 40 then sends the vertical sync and even/odd field information to the video input DMA engine 52. The video input DMA engine 52 contains a register reprogramming processor 54 which generates reprogramming instructions for periodically reprogramming the control registers 42 based upon the sync information and the even/odd field information. Based upon the even/odd field information, the register reprogramming processor either transfers the reprogramming data contained in the odd field data buffer 66 or the reprogramming data contained in the even field data buffer 68 to the video input device 40 over the communications link 44. The reprogramming data instructs the video input device which fields from which video data streams to scale and output. For example, if the odd field reprogramming data is sent to the control register 42, the video input device will scale and output an odd field from the first video data stream. The control register will then be reprogrammed with the even field reprogramming data so that the video device will scale and output an even field from the second video data stream. The video signals are then assigned an address in memory, stored at those addresses, and displayed.

A timing diagram illustrating the reprogramming of the control registers is illustrated in FIG. 6. At the end of a vertical sync period, for example at time T3, the control register instructs the video input device to stop processing the odd field data and to begin processing the even field data. While the even field data is being processed, the video input DMA engine 52 reads the status register of the video input device and then writes the odd field reprogramming data into the control registers 42, As a result, when the next vertical sync period ends, the control registers have already been reprogrammed so that the video input device can begin processing the odd field data. This reprogramming process will continue so that the video input device outputs a stream of odd fields from one of the video data streams interlaced with even fields from the other video data stream. When the outputted video data stream is received by the video input DMA device 56, the video input DMA channel 56 uses the vertical sync information and the even/odd field information to determine which fields in the received data stream should be stored in the same regions in memory. In other words, the video input DMA channel uses the vertical sync and even/odd field information to assign the video data appropriate addresses in memory 62 so that the video data for the video data stream 48 are grouped together and the video data for the video data stream 50 are grouped together. The stored video data can then be displayed on the display screen 64 wherein the video data for the video data stream 48 is displayed in one region of the display screen and the video data for the video data stream 50 is displayed in another region of the display screen.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced herein.

What is claimed is:

1. A method for reprogramming a single-channel video input device to multiplex first video data from a first video source and second video data from a second video source different from said first video source, said video input device containing control registers for controlling the behavior of said video input device, comprising the steps of:

receiving said first video data and second video data at said video input device;

transmitting timing information about said first video data and said second video data to a controller;

generating reprogramming data at said controller, based on said information;

transmitting said reprogramming data to said video input device, wherein said reprogramming data reprogram said control registers; and outputting portions of said first and second video data based upon the reprogrammed control registers;

wherein said control resisters are reprogrammed periodically at intervals based upon said timing information.

2. A method according to claim 1, wherein said information about said video data include vertical sync and even/odd field information.

3. A method according to claim 1, wherein even fields of said first video data stream and odd fields of said second video data stream are outputted.

4. A method according to claim 1, wherein said video input device scales the video data streams based upon said reprogramming data.

5. A method for multiplexing a plurality of video data streams from different sources in a single-channel video input device with one set of control registers which control the operation of the video input device, comprising the steps of:

receiving at least first video data from a first source and a second video data from a second source at said video input device, said video data having certain characteristics;

periodically reprogramming said control registers at intervals based upon timing information contained in said video streams; and outputting portions of said first and second video data based upon how the control registers are programmed.

6. A method according to claim 5, wherein said video data characteristics are vertical sync and even/odd field information.

7. A method according to claim 6, wherein even fields of said first video data stream and odd fields of said second video data stream are outputted.

8. A method according to claim 5, wherein said video input device scales the video data based upon said reprogramming.

9. A method for simultaneously displaying two different video images on a display screen, comprising the steps of:

receiving first video data from a first video source and second video data from a second video source at a video input device, said video input device comprising a set of control registers for controlling the operation of said video input device, wherein said first video data and said second video data each has an odd field and an even field;

extracting vertical sync information and even/odd field information from said first and second video data and transferring said vertical sync information and even/odd field information to an I/O controller;

generating reprogramming information for said control registers based on said vertical sync information and even/odd field information;

transferring said reprogramming information to said control registers;

outputting even field video data of said first video data and odd field video data of said second video data to said I/O controller based upon said reprogramming information;

assigning each field video data an address in a memory based upon said vertical sync information and even/odd field information;

storing said field video data in the memory; and displaying said stored field video data at two different locations on said display screen.

10. A method according to claim 9, wherein said video input device scales the video data based upon said reprogramming information.

11. An apparatus for multiplexing a plurality of video data streams from different sources in a single-channel video input device with a set of control registers which control the operation of the video input device, comprising the steps of:

means for receiving at least first video data from a first source and second video data from a second source at said video input device, said video data having certain characteristics;

means for periodically reprogramming said control registers at intervals based upon timing information contained in said video data; and means for outputting portions of said first and second video data based upon the reprogrammed control registers.

12. An apparatus according to claim 11, wherein the video data characteristics are vertical sync and even/odd field information.

13. An apparatus according to claim 11, wherein even fields of said first video data and odd fields of said second video data are outputted.

14. An apparatus according to claim 11, wherein said video input device scales the video data based upon the reprogramming.

15. An apparatus for simultaneously displaying two different video images on a display screen, comprising:
   a video input device which receives first video data from a first video source and a second video data from a second video source, said video input device comprising a set of control registers for controlling the operation of said video input device, wherein said first video data and said second video data both have an odd field and an even field;
   means for extracting vertical sync information and even/odd field information from said video data and transferring said vertical sync information and even/odd field information to an I/O controller;
   means for generating reprogramming information for said control registers based on said vertical sync information and even/odd field information;
   means for transferring said reprogramming information to said control registers;
   means for outputting even field video data of said first video data stream and odd field video data of said second video data to said I/O controller based upon said reprogramming information;
   means for assigning each field video data an address in a memory based upon said vertical sync information and even/odd field information;
   memory means for storing said field video data; and
   means for displaying the stored field video data streams at two different locations on said display screen.

16. An apparatus according to claim 15, wherein a video input DMA engine generates said reprogramming information.

17. An apparatus according to claim 15, wherein a video input DMA channel assigns said field video data an address in the memory.

18. An apparatus according to claim 15, wherein said video input device scales the video data based upon said reprogramming information.

* * * * *